(12) United States Patent
John et al.

(10) Patent No.: US 8,145,626 B2
(45) Date of Patent: Mar. 27, 2012

(54) METHOD AND SYSTEM FOR DATA PROCESSING USING MULTIDIMENSIONAL FILTERING

(75) Inventors: Peter John, Heidelberg (DE); Thomas Zurek, Walldorf (DE)

(73) Assignee: SAP AG, Walldorf, DE (US)

( * ) Notice: Subject to any disclaimer, the term of this patent is extended or adjusted under 35 U.S.C. 154(b) by 360 days.

(21) Appl. No.: 12/347,729

(22) Filed: Dec. 31, 2008

(65) Prior Publication Data
US 2010/0169267 A1 Jul. 1, 2010

(51) Int. Cl.
*G06F 17/00* (2006.01)

(52) U.S. Cl. ........ 707/717; 707/706; 707/713; 707/714; 707/715; 707/716; 707/718; 707/719; 707/720; 707/721; 707/722; 707/736; 707/758; 707/781

(58) Field of Classification Search .................. 707/706, 707/713–722, 736, 758, 781, 999.002–999.003
See application file for complete search history.

(56) References Cited

U.S. PATENT DOCUMENTS
2004/0015470 A1\* 1/2004 Smith et al. .................... 707/1
2005/0065939 A1\* 3/2005 Miao ............................ 707/100

\* cited by examiner

*Primary Examiner* — Syling Yen
(74) *Attorney, Agent, or Firm* — Fountainhead Law Group PC

(57) ABSTRACT

In one embodiment the present invention includes a method comprising receiving a data filter for filtering a collection of data, wherein the collection of data is configured as a star schema including a fact table and dimension tables. The data filter is applied against the dimension tables to generate a modified dimension table. The modified dimension tables are applied against the fact table to produce a modified fact table. The data filter is then applied against the modified fact table to generate a second modified fact table, which is the output of the process.

20 Claims, 16 Drawing Sheets

METHOD AND SYSTEM FOR DATA PROCESSING USING MULTIDIMENSIONAL FILTERING

BACKGROUND

The present invention relates to computer software, and in particular, to a method and system for data processing using multidimensional filtering.

Unless otherwise indicated herein, the approaches described in this section are not prior art to the claims in this application and are not admitted to be prior art by inclusion in this section.

Generally, there are numerous methods used to model large collections of data (e.g., data warehouses). One particular approach is to model data according to a star schema. Typically, a star schema includes one or more fact tables, and one or more dimension tables associated with one of the fact tables. A fact table may be configured to include information (i.e., facts) that describes virtually anything desired. A dimension table may further describe a fact in a fact table. For example, a fact table of sales transactions may include facts like the purchasing customer, the item purchased, the quantity purchased, and when the purchase was made. A dimension table associated with this fact table may include information about the purchasing customer (e.g. name, address, telephone number). Another dimension table associated with this fact table may include information about the when the item was purchased (e.g., time, day, month, year). Thus, fact tables and dimension tables may be defined to include all types of information.

With large collections of data, including collections of data modeled based on a star schema, it may be desirable to filter the collection of data based on some predefined criteria to produce a subset of data that includes data that meets the predefined criteria. Accordingly, filtering the data may be a resource intensive process due to the amount of data being filtered and the type of criteria defined. In particular, filtering data based on multiple dimension tables (i.e., use of a multidimensional filter) may cause heavy use of resources and long wait times in producing the results.

Thus, there is a need for improved techniques for data processing using multidimensional filtering. The present invention solves these and other problems by providing a method and system for data processing using multidimensional filtering.

SUMMARY

Embodiments of the present invention improve the manner in which collections of data are processed using multidimensional filters. In one embodiment the present invention includes a method comprising receiving a data filter for filtering a collection of data, wherein the collection of data is configured as a star schema that includes one fact table and one or more dimension tables associated with the fact table, wherein the data filter includes a plurality of columns, wherein one or more columns of the plurality of columns are associated with a corresponding one or more dimension tables in the collection of data, and processing the collection of data, wherein the processing includes, for each column in the data filter associated with a dimension table in the collection of data, generating a modified dimension table, wherein the modified dimension table includes rows from the associated dimension table in the collection of data that satisfy the data filter and does not include rows from the associated dimension table in the collection of data that do not satisfy the data filter, generating a first modified fact table, wherein the first modified fact table includes rows from the fact table that satisfy each modified dimension table and does not include rows from the fact table that do not satisfy each modified dimension table, and generating a second modified fact table, wherein the second modified fact table includes rows from the first modified fact table that satisfy the data filter and does not include rows from the first modified table that do not satisfy the data filter.

The following detailed description and accompanying drawings provide a better understanding of the nature and advantages of the present invention.

DETAILED DESCRIPTION

Described herein are techniques for data processing using multidimensional filtering. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
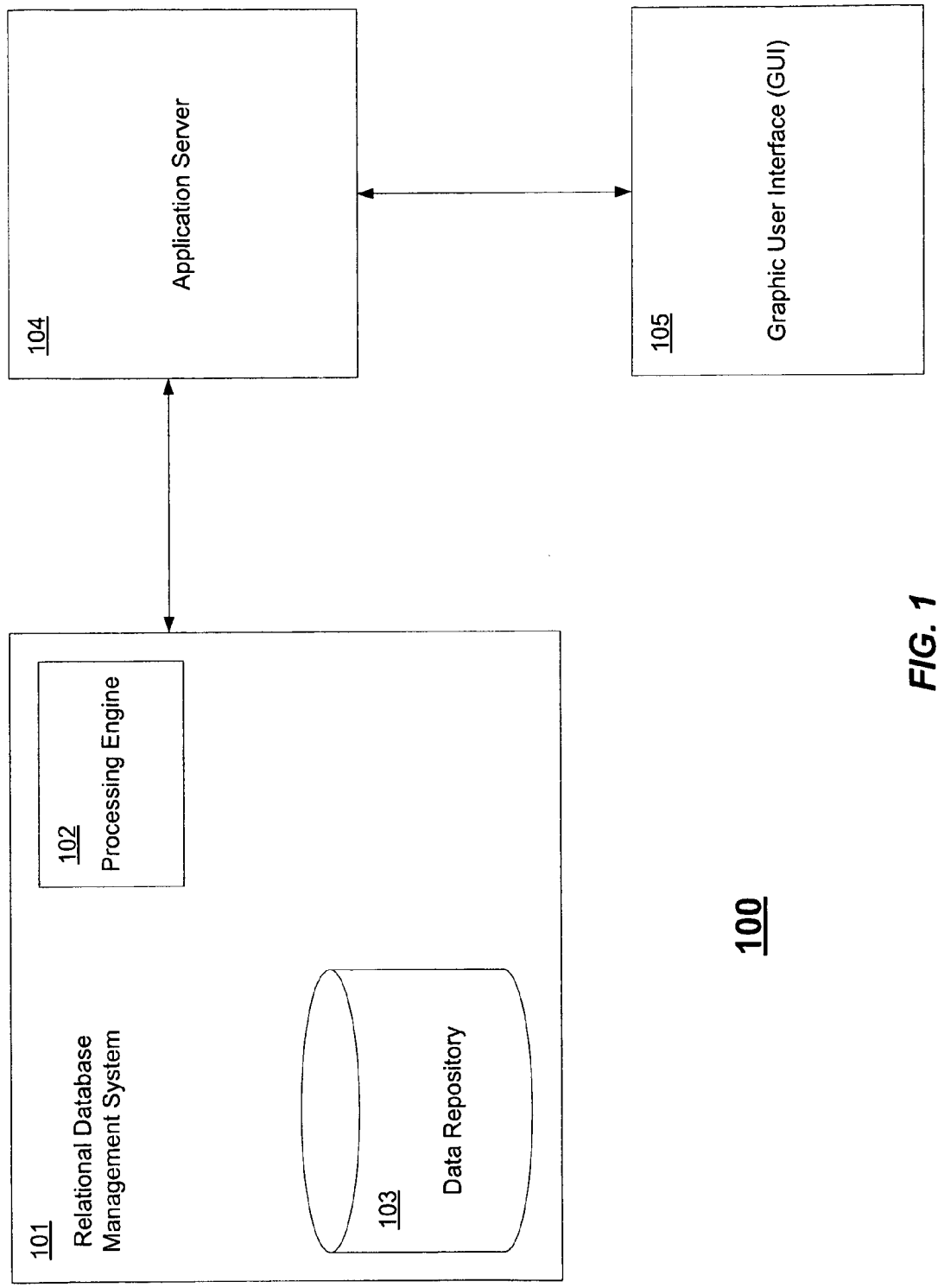
FIG. 1 illustrates a system for data processing according to one embodiment of the present invention.

FIG. 1 illustrates a system 100 for data processing according to one embodiment of the present invention. System 100 may include relational database management system 101, application server 104, and graphic user interface (GUI) 105. System 100 may be enabled to allow a user to interact with graphical user interface 105 to retrieve data, via application server 104, from a large collection of data managed by relational database management system 101. For example, graphical user interface 105 may be enabled to allow a user to specify certain criteria and request data (e.g., a web form provided by application server 104) that may be stored in relational database management system 101. The request may be communicated to application server 104. Then, based on the request, application server 104 may communicate a request for the data, in a suitable form, to relational database management system 101. Relational database management system 101 may then process the request for the data using methods according to embodiments of the present invention as described below. The resulting data produced by relational database management system 101 may be communicated to application server 104. In turn, application server 104 may communicate the data, in a suitable form, to graphic user interface 105. It is to be understood that the above system is just one example submitting data requests.

In one embodiment of the present invention, relational database management system 101 may include a processing engine 102 and a data repository 103. Processing engine 102 may be configured to process the request for the data using methods according to embodiments of the present invention as described below. Data repository 103 may store the data, and may comprise one or more databases, for example. Accordingly, data repository 103 may allow processing engine 102 to retrieve data, store data, create data, delete data, as well as other operations that processing engine 102 may require in order to process requests for data.

Figure 2:
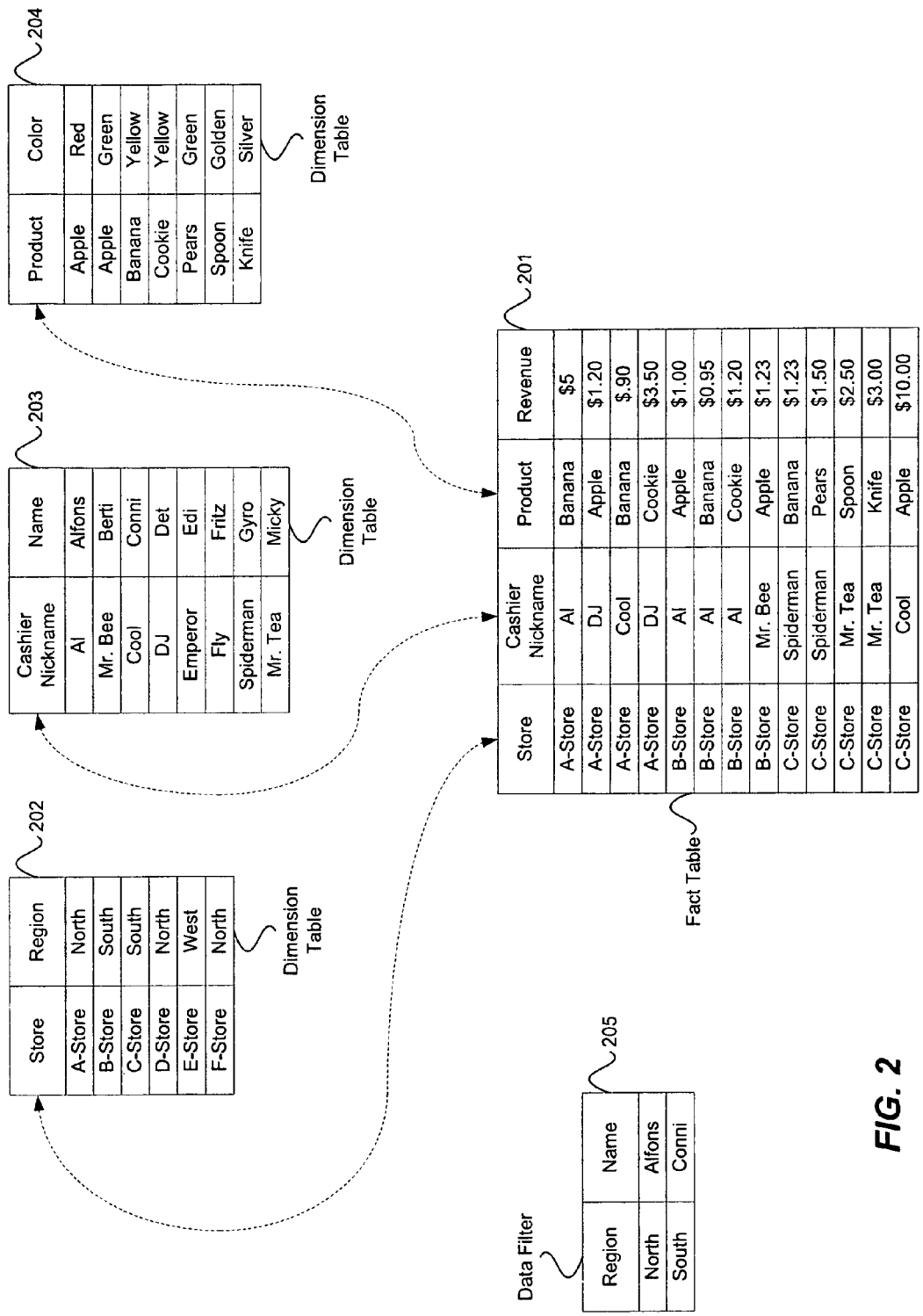
FIG. 2 illustrates an example collection of data organized in a star schema, and data filter, according to one embodiment of the present invention.

FIG. 2 illustrates an example collection of data organized in a star schema and a data filter according to one embodiment of the present invention. Generally, a star schema is a way of modeling data that includes one or more fact tables and one or more dimension tables where a dimension table is associated with one of the fact tables. A fact table may include data (i.e. facts) that describe an event or transaction (e.g. a sale, telephone call, web page request) of interest. A dimension table may include data that further describes a particular fact in the fact table. For example, in FIG. 2, fact table 201 describes sales and includes the columns "Store," "Cashier Nickname," "Product," and "Revenue." Dimension table 202 is associated with fact table 201 because dimension table 202 further describes the "Store" fact of fact table 201 by providing information about what region a particular store is located (e.g., North, South, East, West). Accordingly, dimension table 202 includes the columns "Store," and "Region" where the "Store" column in dimension table 202 corresponds with the "Store" column in fact table 201. Similarly, dimension table 203 is associated with fact table 201 because dimension table 203 further describes the "Cashier Nickname" fact of fact table 201 by providing information about a cashier's real name. Therefore, dimension table 203 includes the columns "Cashier Nickname," and "Name" where the "Cashier Nickname" column in dimension table 203 corresponds with the "Cashier Nickname" column in fact table 201. Likewise, dimension table 204 is associated with fact table 201 because dimension table 204 further describes the "Product" fact of fact table 201 by providing information about a product's color (e.g., Red, Green, Yellow). Therefore, dimension table 204 includes the columns "Product," and "Color" where the "Product" column in dimension table 204 corresponds with the "Product" column in fact table 201. Accordingly, specific columns in the fact table may be associated with specific columns in the dimension table as illustrated above, for example.

FIG. 2 also illustrates an example data filter 205. Data filters may specify certain criteria to be used to filter a large collection of data thereby producing a subset of data that includes data that meets the specified criteria. Furthermore, a data filter may specify criteria in a variety ways. A data filter may specify criteria based on values in a column directly associated with a fact table or values in a column in a dimension table (i.e., values in a column indirectly associated with a fact table). A data filter may also specify criteria based on a single column in either a fact table or a dimension table. Features and advantages of the present invention include processes using multidimensional data filters, which are data filters that specify criteria based on a plurality of columns, where one or more columns are associated with a corresponding one or more dimension tables. Data filter 205 is an exemplary multidimensional data filter. That is, data filter 205 specifies values in a plurality of columns (i.e., "Region," and "Name") where one or more columns are associated with a corresponding one or more dimension tables (i.e., "Region" is associated with corresponding dimension table 202, and "Name" is associated with corresponding to dimension table 203). In other embodiments, data filter 202 may be defined to specify values in a column directly associated with the fact table (e.g., "Revenue").

Figure 3:
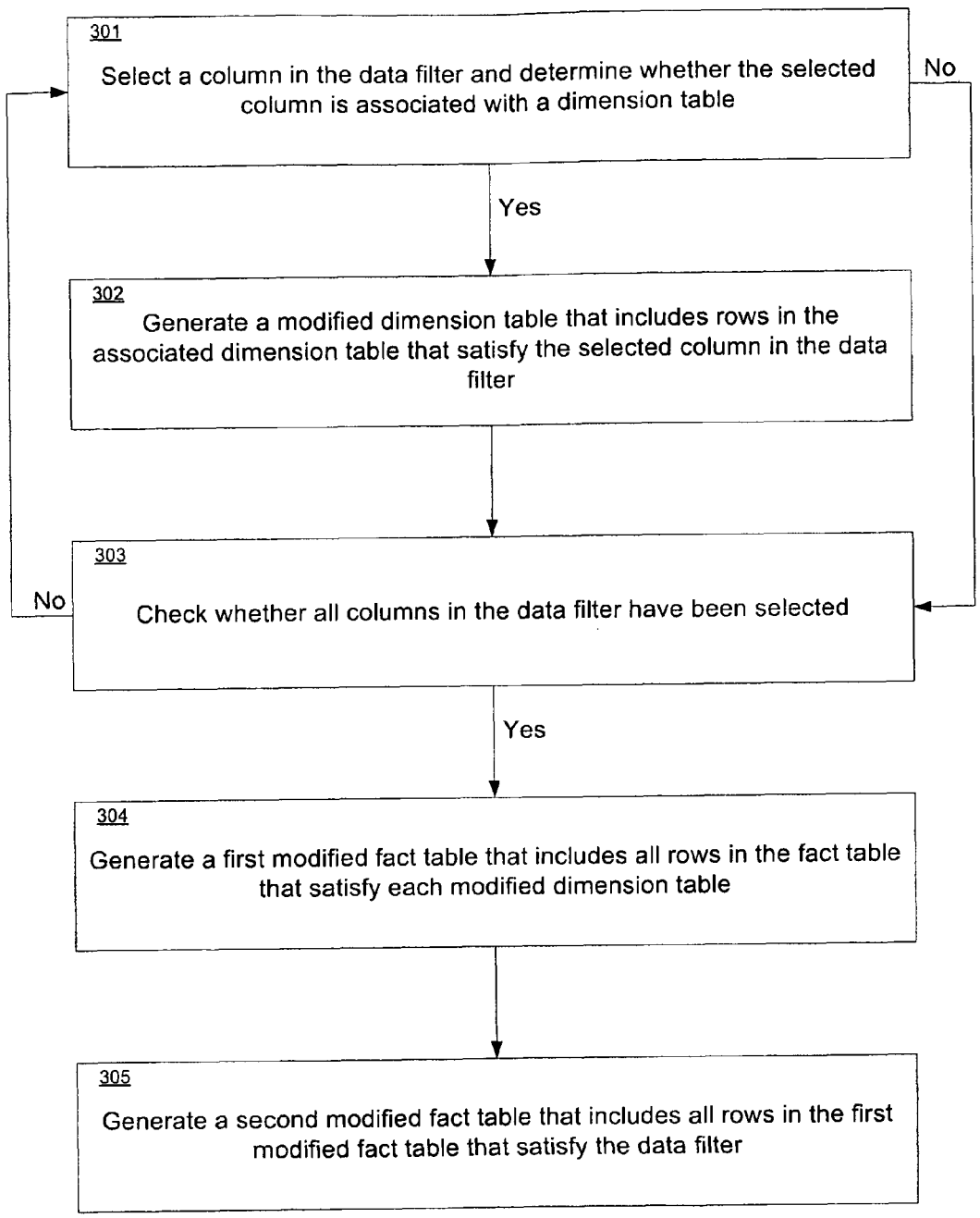
FIG. 3 illustrates a method of processing data using multidimensional filters according to one embodiment of the present invention.
Figure 6:
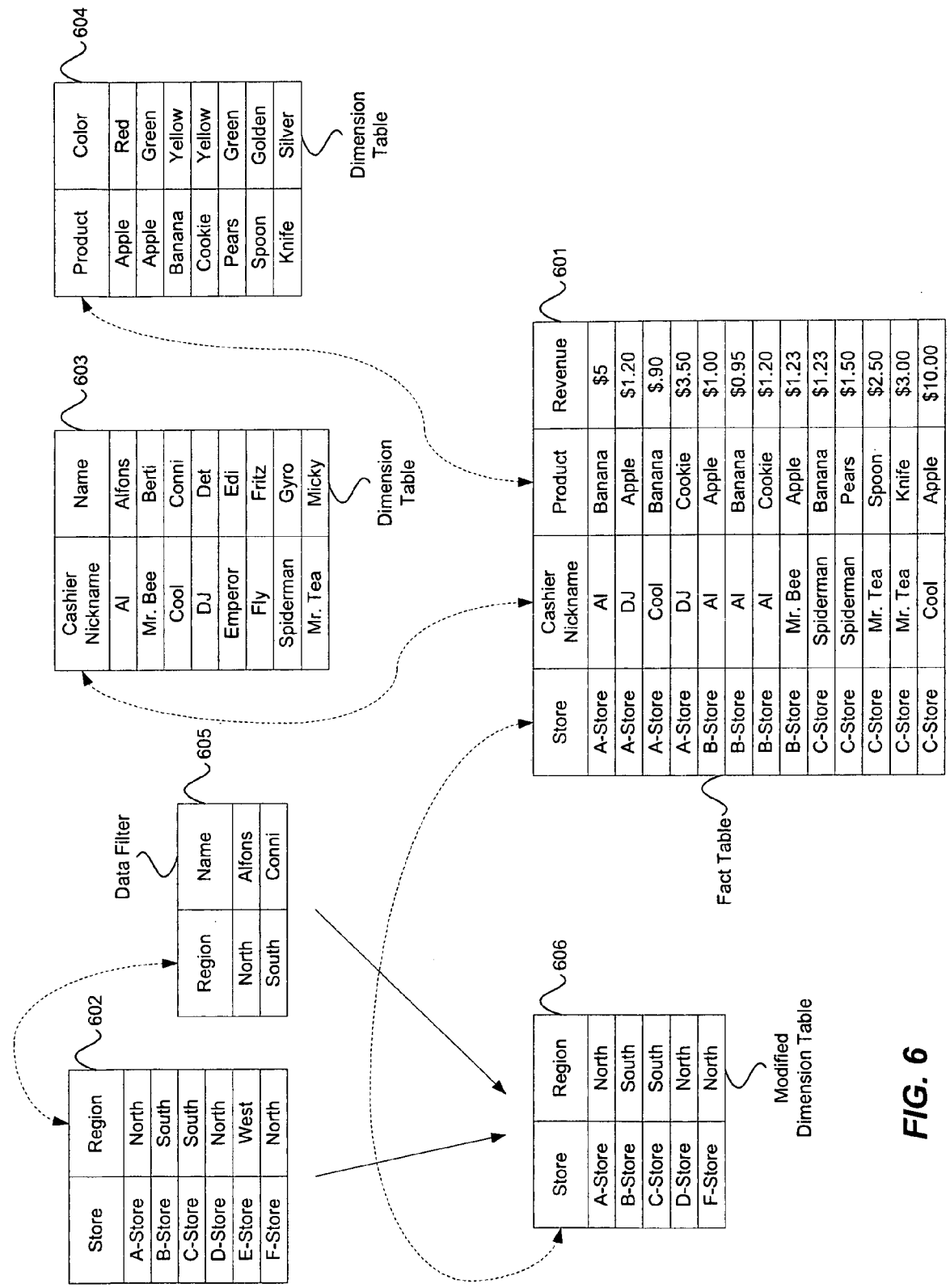
FIG. 6 illustrates generating a modified dimension table according to one embodiment of the present invention.
Figure 7:
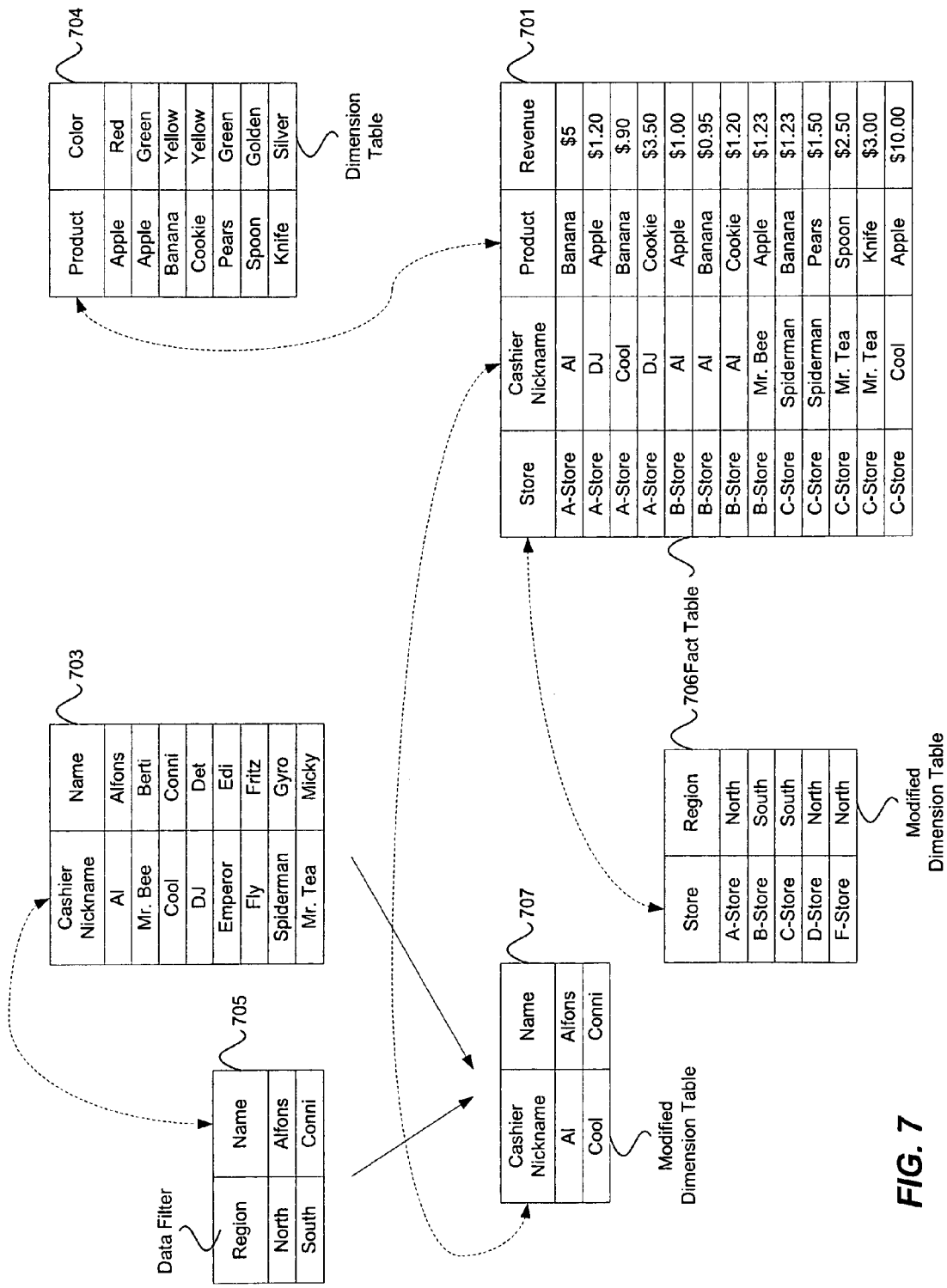
FIG. 7 illustrates generating another modified dimension table according to one embodiment of the present invention.
Figure 8:
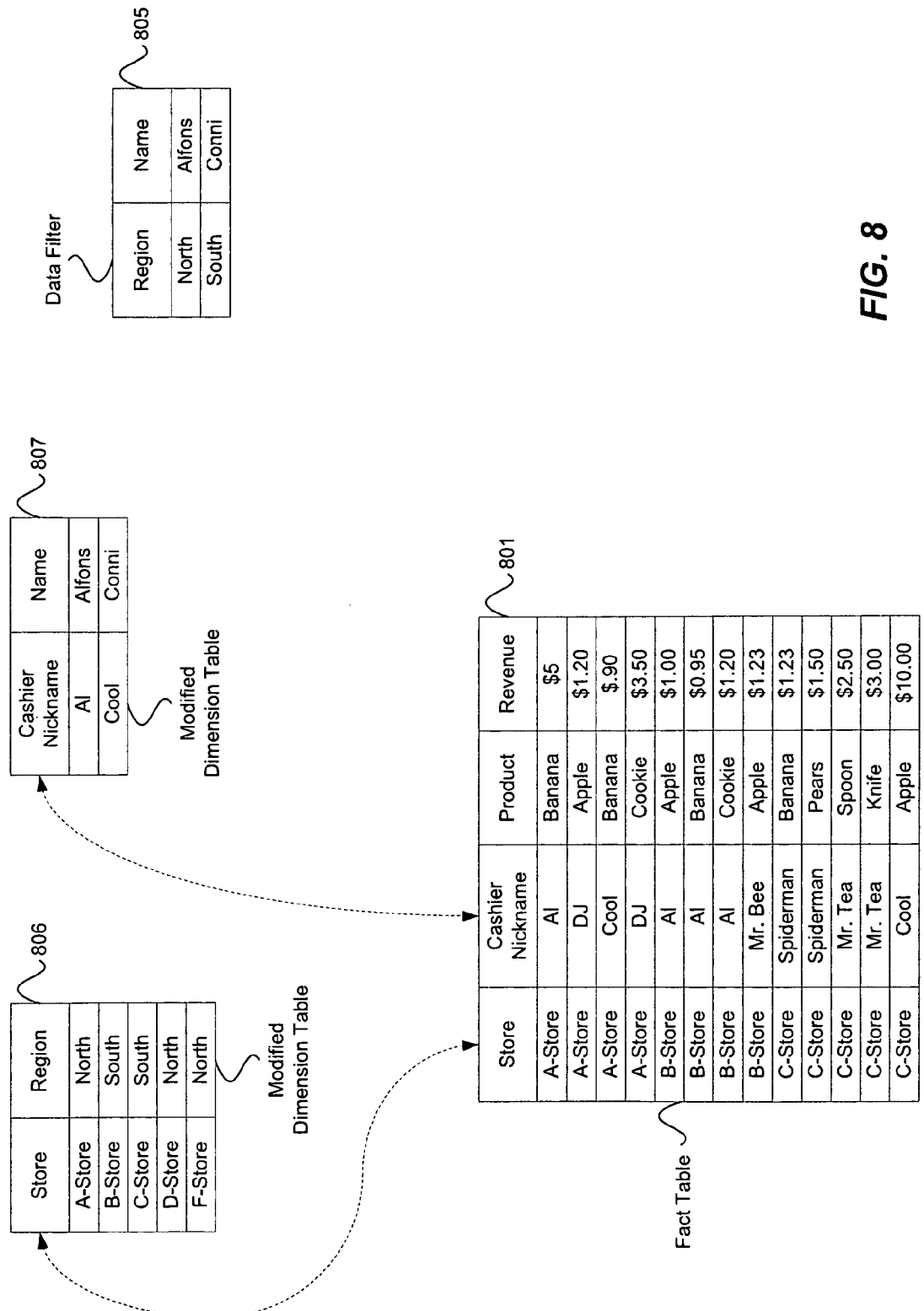
FIG. 8 illustrates the modified dimension tables after all the modified dimension tables have been generated according to one embodiment of the present invention.

FIG. 3 illustrates a method of processing data using multidimensional filters according to one embodiment of the present invention. The collection of data and the data filter in FIG. 2 may be an example where the method illustrated in FIG. 3 may be applied. First, at 301, a column in the data filter may be selected and it may be determined whether the selected column is associated with a dimension table. This step is illustrated in FIG. 6. The "Region" column in data filter 605 may be the selected column. Since the "Region" column in dimension table 602 corresponds to the "Region" column in data filter 605, the selected "Region" column in data filter 605 may be determined to be associated with dimension table 602. At step 302, a modified dimension table may be generated that includes rows in the associated dimension table that satisfy the selected column in the data filter. Referring to FIG. 6, modified dimension table 606 may be generated from dimension table 602 and data filter 605. Each row in modified dimension table 606 may be a row in dimension table 602 that satisfies data filter 605. Specifically, modified dimension table 606 may include the rows in dimension table 602 where the value in the "Region" column in dimension table 602 may be specified in data filter 605 (i.e., "North" and "South"). Next, at 303, the data filter may be checked whether all the columns in the data filter have been selected. If all the columns have been selected, the method may proceed to step 304. If not, the method may go back to step 301 and continues to iterate through steps 301 to 303 until all the columns in the data filter have been selected. According to FIG. 6, the "Region" column has been selected, and the "Name" column has not been selected. Hence, the method may go back to step 301 and select "Name" where steps 302 and 303 may be performed again. FIG. 8 illustrates the modified dimension tables after step 303 and before step 304 where all the columns in data filter 805 (605 in FIG. 6) have been selected and all the modified dimension tables have been generated. The "Store" column in modified dimension table 806 corresponds to the "Store" column in fact table 801. Similarly, the "Cashier Nickname" column in modified dimension table 807 corresponds to the "Cashier Nickname" column in fact table 801.

Figure 9A:
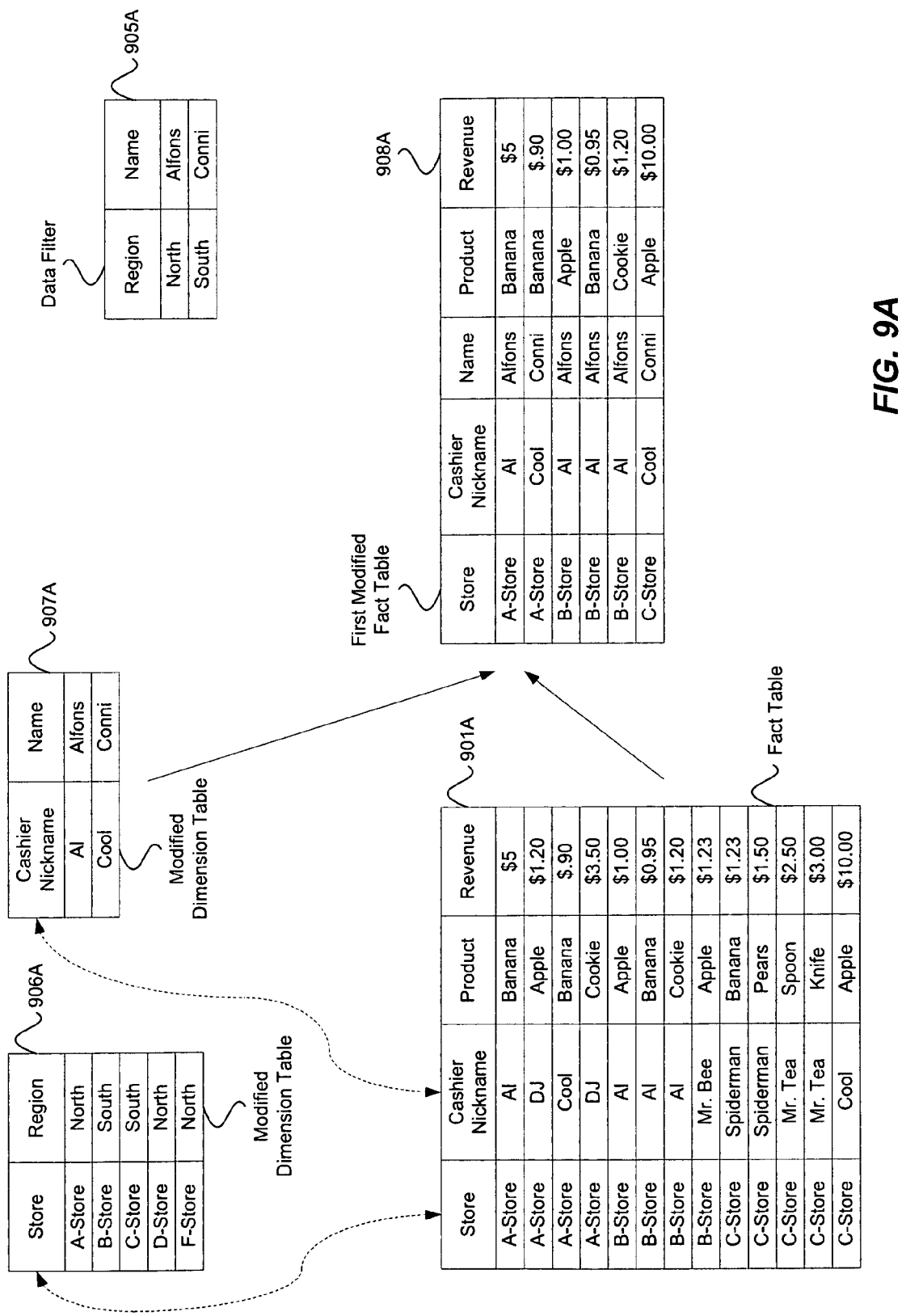
FIG. 9A illustrates one step in generating a first modified fact table according to one embodiment of the present invention.
Figure 10A:
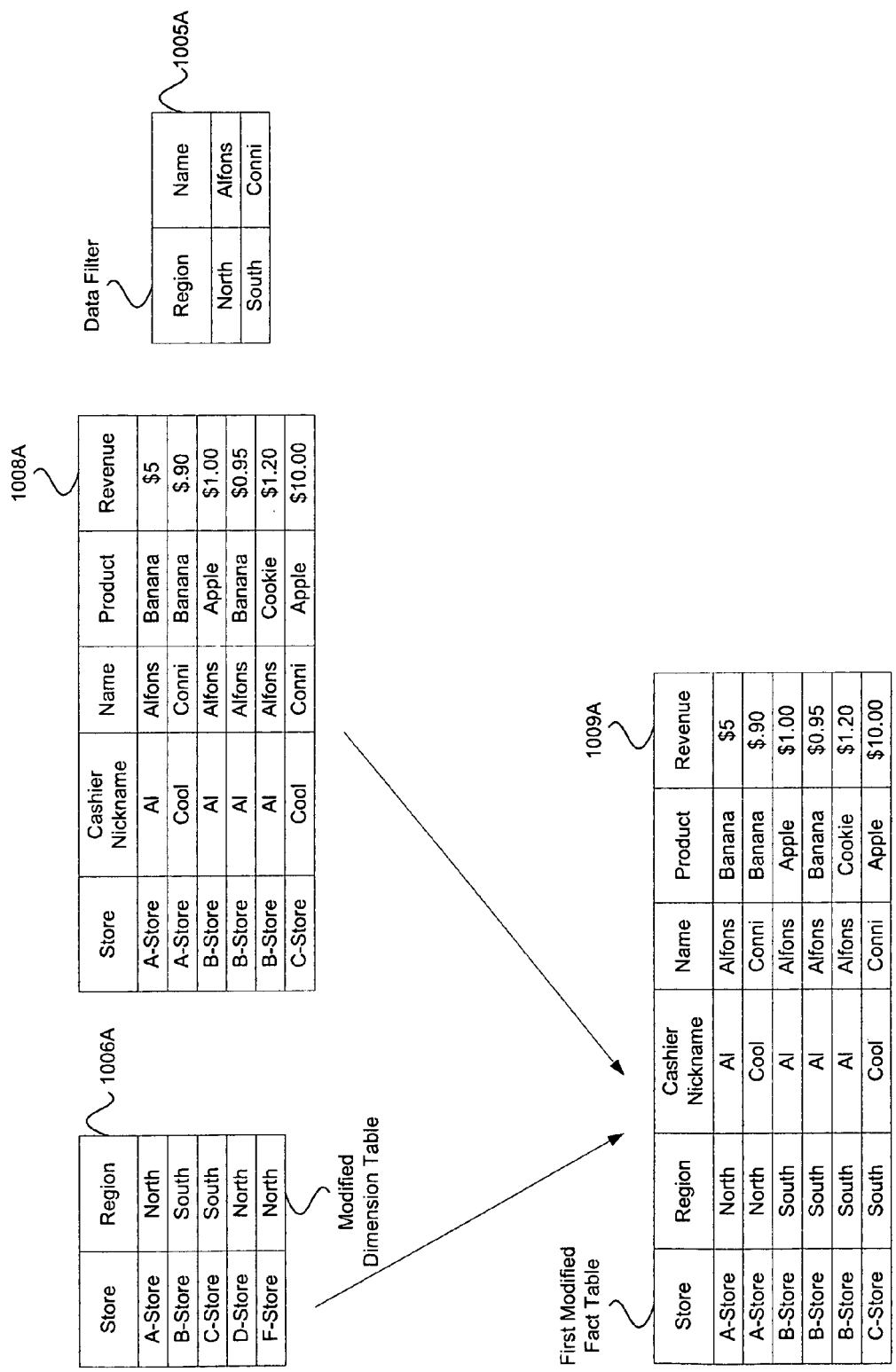
FIG. 10A illustrates another step in generating a first modified fact table according to one embodiment of the present invention.

At step 304, a first modified fact table may be generated that may include rows in the fact table that satisfy each modified dimension table. FIG. 9A illustrates one step at 304 in generating a first modified fact table. In particular, FIG. 9A shows an unfinished generation of a first modified fact table where only one modified dimension table and the fact table have been used to partially generate the first modified fact table. Accordingly, modified dimension table 907A and fact table 901A may be used to partially generate first modified fact table 908A. Each row in partially generated first modified fact table 908A may be a row in fact table 901A that satisfies modified dimension table 907A. Because the "Cashier Nickname" column in modified dimension table 907A corresponds to the "Cashier Nickname" column in fact able 901A, partially generated fact table 908A may include the rows in fact table 901A where the value in "Cashier Nickname" column in fact table 901A may be specified in modified dimension table 907A (i.e., "Al" and "Cool"). FIG. 10A illustrates another step at 304 in generating a first modified fact table. In particular, FIG. 10A shows a finished generation of a first modified fact table. Modified dimension table 1006A and partially generated first modified fact table 1008A (908A of FIG. 9A) are used to complete generation of first modified fact table 1009A. According to step 304, each row in generated first modified fact table 1009A may be a row in fact table 901A of FIG. 9A that satisfies modified dimension table 1006A. Thus, each row in fact table 1009A may be a row in partially generated first modified fact table 1008A that satisfies modified dimension table 1006A. Because the "Store" column in modified dimension table 1006A corresponds to the "Store" column in partially generated first modified fact able 1008A, first modified fact table 1009A may include the rows in partially generated first modified fact table 1008A where the value in the "Store" column in partially generated first modified fact table 1008A may be specified in modified dimension table 1006A (i.e., "A-Store," "B-Store," "C-Store," "D-Store," and "F-Store").

Figure 11:
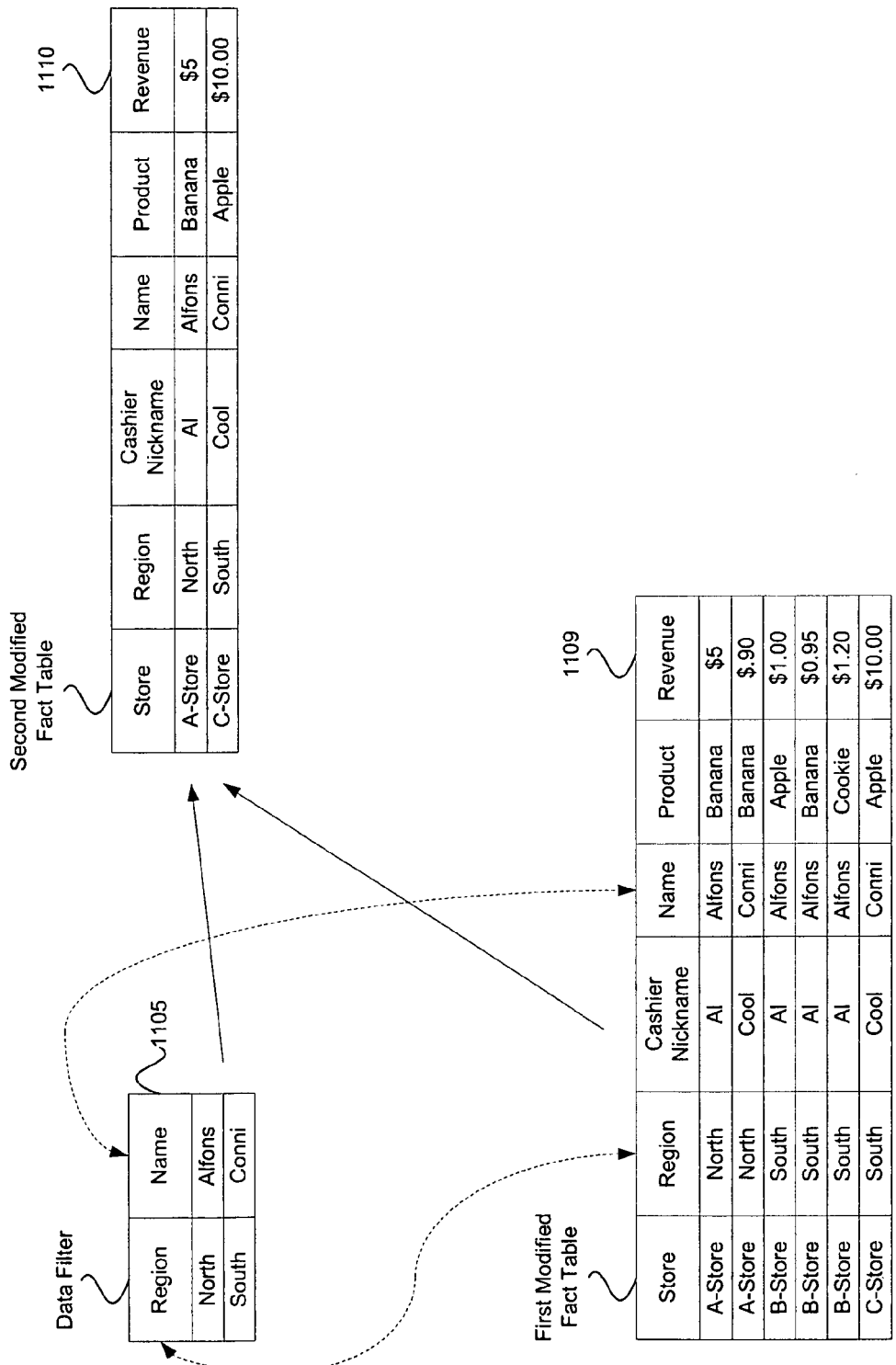
FIG. 11 illustrates generating a second modified fact table according to one embodiment of the present invention.

Then, at 305, a second modified fact table may be generated that includes all rows in the first modified fact table that satisfy the data filter. The second modified fact table may be output as the resulting data filter operation, and includes the subset of the collection of data (e.g., the filter result). FIG. 11 illustrates this step of generating a second modified fact table. Referring to FIG. 11, second modified fact table 1110 may be generated from first modified fact table 1109 and data filter 1105. Each row in second modified fact table 1110 may be a row in first modified fact table 1109 that satisfies data filter 1105. Therefore, second modified fact table 1110 may include the rows in first modified fact table 1109 where the value in the "Region" column in first modified fact table 1109 and the value in the "Name" column in first modified fact table 1109 may be specified in a particular row in data filter 605 (i.e., "North/Alfons" and "South/Conni").

Figure 4:
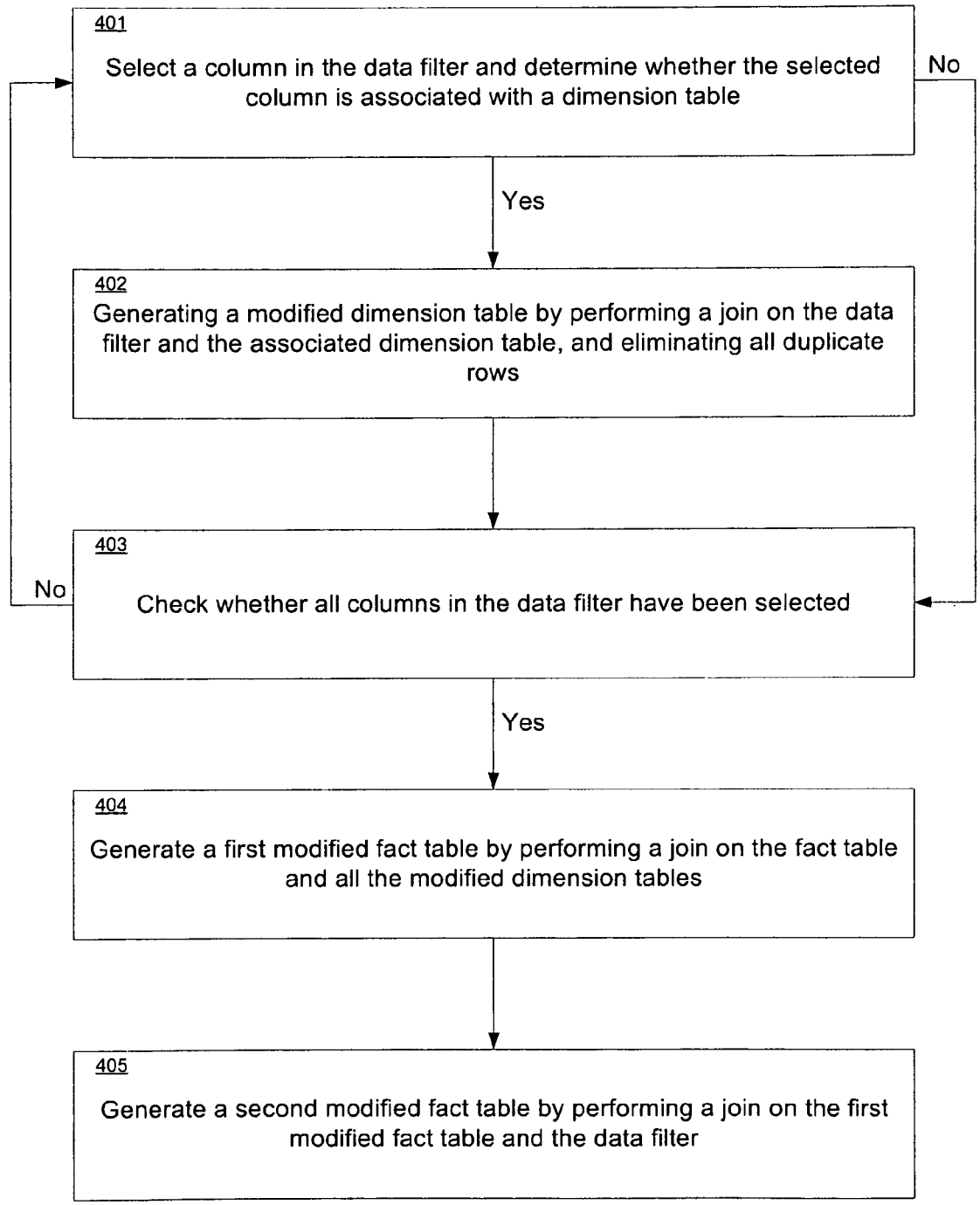
FIG. 4 illustrates another method of processing data using multidimensional filters according to one embodiment of the present invention.

FIG. 4 illustrates another method of processing data using multidimensional filters according to one embodiment of the present invention. The collection of data and the data filter in FIG. 2 may be an example where the method illustrated in FIG. 4 may be applied. The method in FIG. 4 is similar to the method in FIG. 3 except the generation of tables in steps 402, 404, and 405 (steps 302, 304, and 305 in FIG. 3) may include the execution of a join operation. For purposes of this invention, a join operation refers to a typical SQL join operation performed in a relational database management system. The join operation may also be referred to by the more specific name—an inner join. At 401, the same step as step 301 in FIG. 3 may be performed. At 402, a modified dimension table may be generated by performing a join operation on the data filter and the associated dimension table, and eliminating all the duplicate rows. Looking at FIG. 6, a join operation may be performed on data filter 605 and dimension table 602 to generate modified dimension table 606. The join operation on data filter 605 and dimension table 602 did not result in any duplicate rows, and, therefore, no rows were eliminated. However, there may be instances where a join operation on a data filter and a dimension table may result in duplicate rows. In that case, the generation of the modified dimension table may include eliminating the duplicate rows. At step 403, the same step as 303 in FIG. 3 may be performed. Then, at 404, a first modified fact table may be generated by performing a join operation on the fact table and each modified dimension table. Referring to FIG. 8, a join operation may be performed on fact table 801 and modified dimension tables 806 and 807 resulting in a generated first modified fact table 1009B in FIG. 10B. Next, at 405, a second modified fact table may be generated by performing a join operation the first modified fact table and the data filter. Looking at FIG. 11, a second modified fact table 1110 may be generated by performing a join operation on first modified fact table 1109 and data filter 1105. As mentioned above, the second modified fact table may be output as the resulting data filter operation, and includes the subset of the collection of data (e.g., the filter result).

Figure 5A:
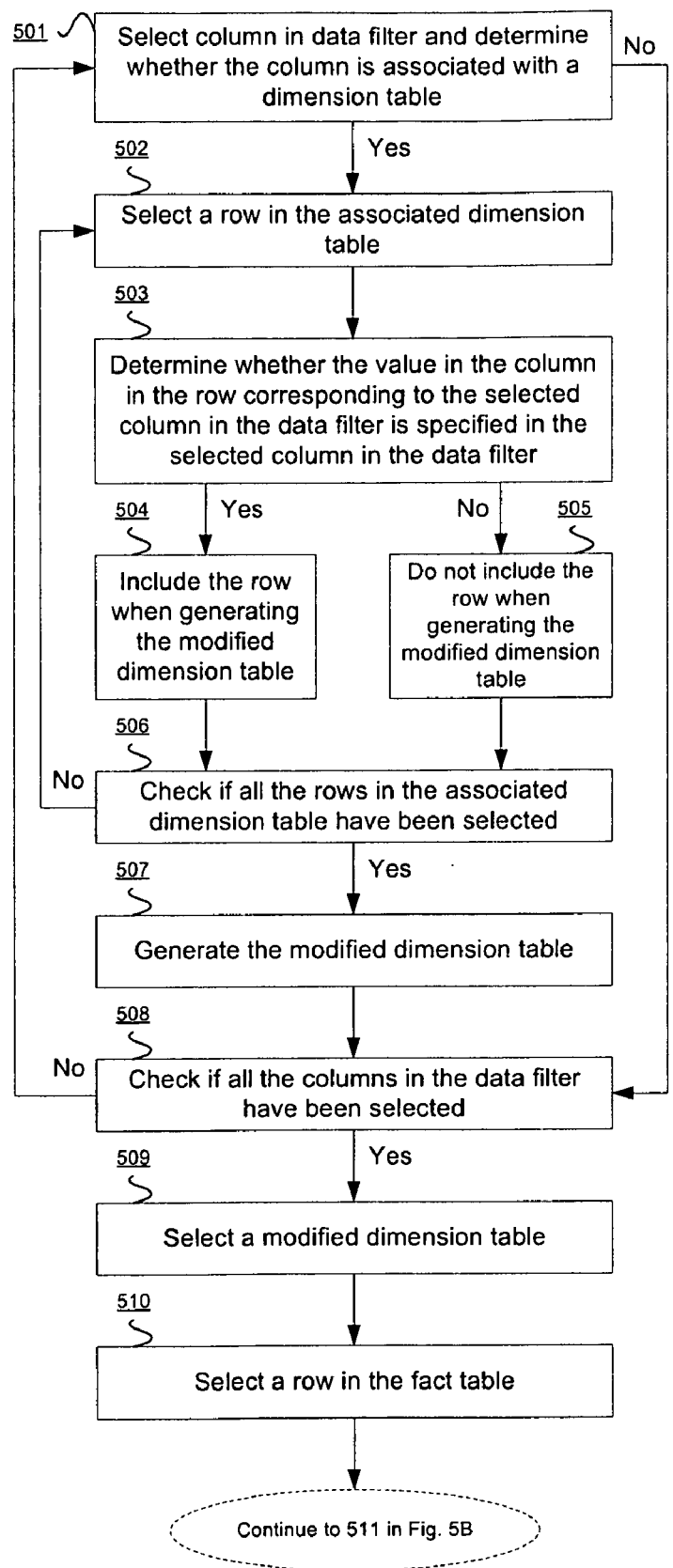
FIGS. 5A-C illustrates another method of processing data using multidimensional filters according to one embodiment of the present invention.
Figure 5B:
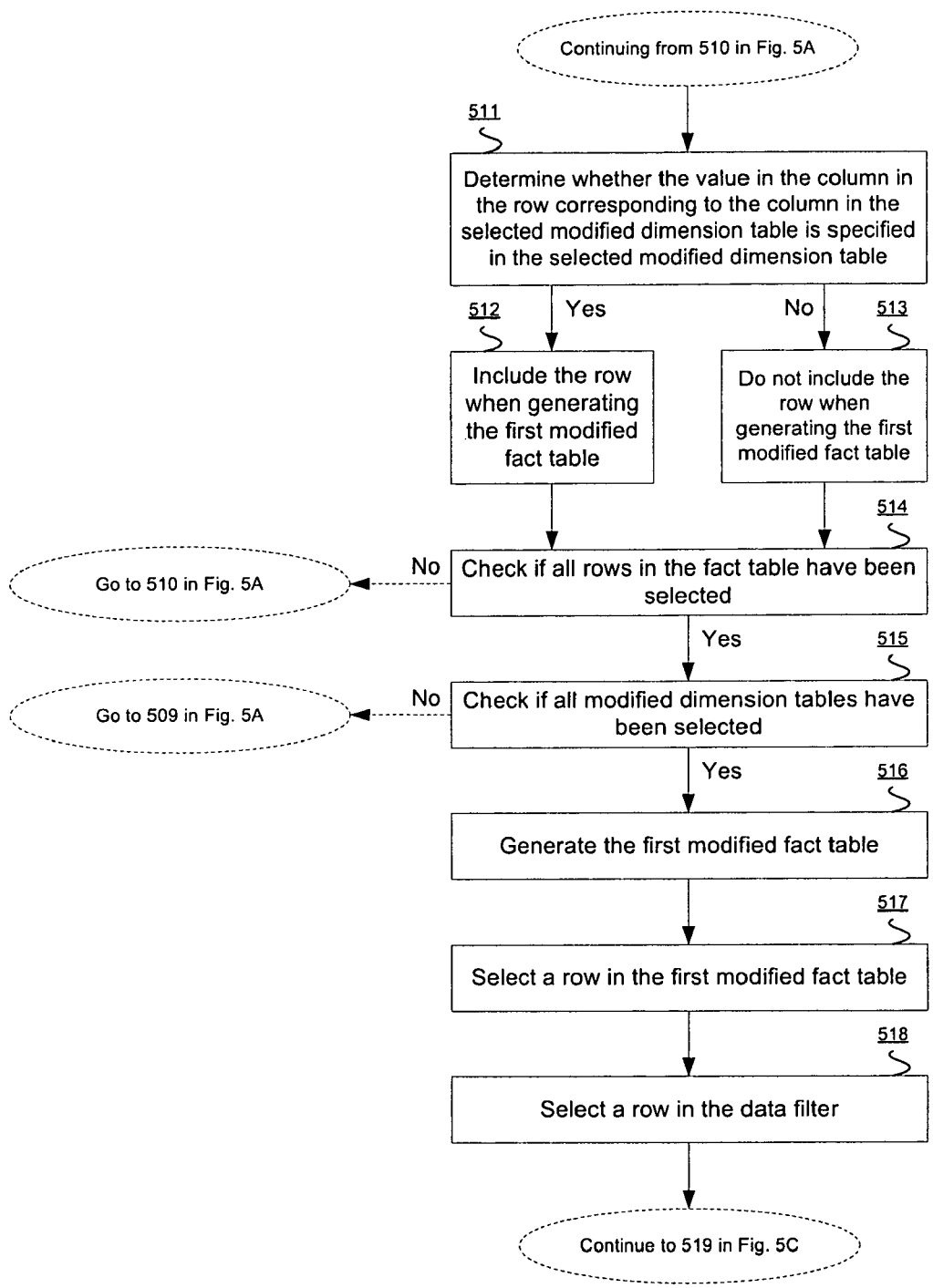
Figure 5C:
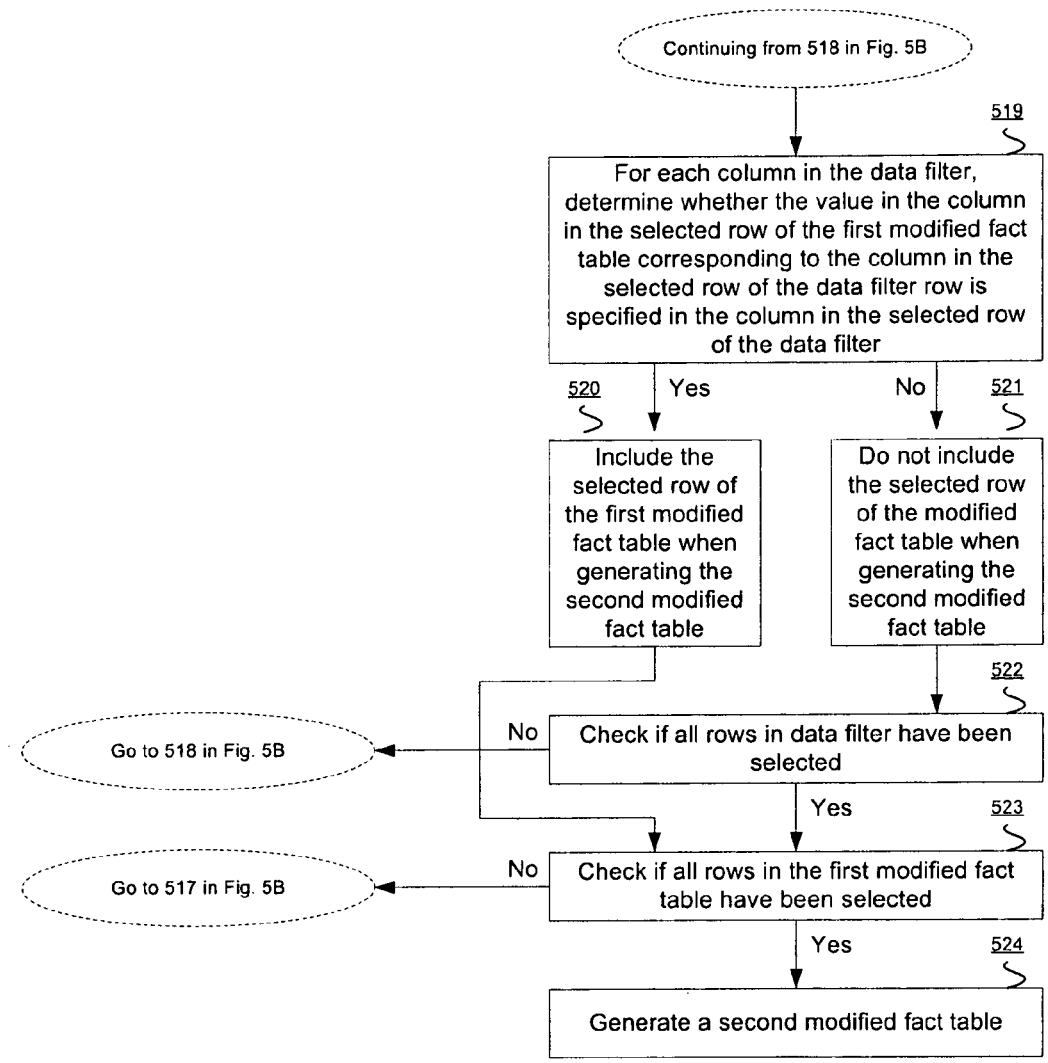

FIGS. 5A-C illustrates another method of processing data using multidimensional filters according to one embodiment of the present invention. The collection of data and the data filter in FIG. 2 may be an example where the method illustrated in FIGS. 5A-C may be applied. Referring to FIG. 5A, step 501 is similar to step 301 of FIG. 3 where a column in the data filter may be selected and it may be determined whether the selected column is associated with a dimension table. This step is illustrated in FIG. 6 where the "Region" column in data filter 605 may be selected. At 502, a row in the associated dimension table may be selected. For example, in FIG. 6, the first row in modified dimension table 602 may be selected ("Store: A-Store" and "Region: North"). At 503, it may be determined whether the value in the column in the selected row corresponding to the selected column in the data filter may be specified in the selected column in the data filter. Based on FIG. 6, the "Region" column in the selected row corresponds to the selected "Region" column in data filter 605. Thus, it may be determined whether the value "North" in the "Region" column in the selected row may be specified in the "Region" column of data filter 605. If the value is specified in the data filter, the method proceeds to 504 where the selected row may be included when generating the modified dimension table (i.e., step 507). Otherwise, the method proceeds to 505 where the selected row may not be included when generating the modified dimension table (i.e., step 507). Continuing the example, the method moves to 504 since the value "North" in the "Region" column in the selected row is specified in data filter 605. Accordingly, the selected row (i.e. the first row in dimension table 602) may be included when generating the modified dimension table in step 507. Both steps 504 and 505 continue to step 506 where the associated dimension table may be checked whether all the rows of the associated dimension table have been selected. If all the rows of the associated dimension table have been selected, the method proceeds to 507. If not, the method proceeds back to 502. Continuing this example, because only the first row in dimension table 502 has been selected, the method proceeds back to 502 where another row in the associated dimension table may be selected. Steps 503-504 may be repeated until all the rows in the associated dimension table have been selected. Once all the rows in the associated dimension table have been selected, the method moves to 507. At 507, a modified dimension table may be generated where the modified dimension table includes the rows determined to be included from step 503 and does not include the rows determined to not be included from step 503. FIG. 6 shows modified dimension table 606 generated at step 507. Next, at step 508, the data filter may be checked whether all the columns in the data filter table have been selected. If so, the method moves to 509. If not, the method moves back to 501 where another column in the data filter may be selected and it maybe determined whether the column may be associated with a dimension table. FIG. 8 illustrates the modified dimension tables after step 508 and before step 509 where all the columns in the data filter have been selected and all the modified dimension tables have been generated.

Figure 9B:
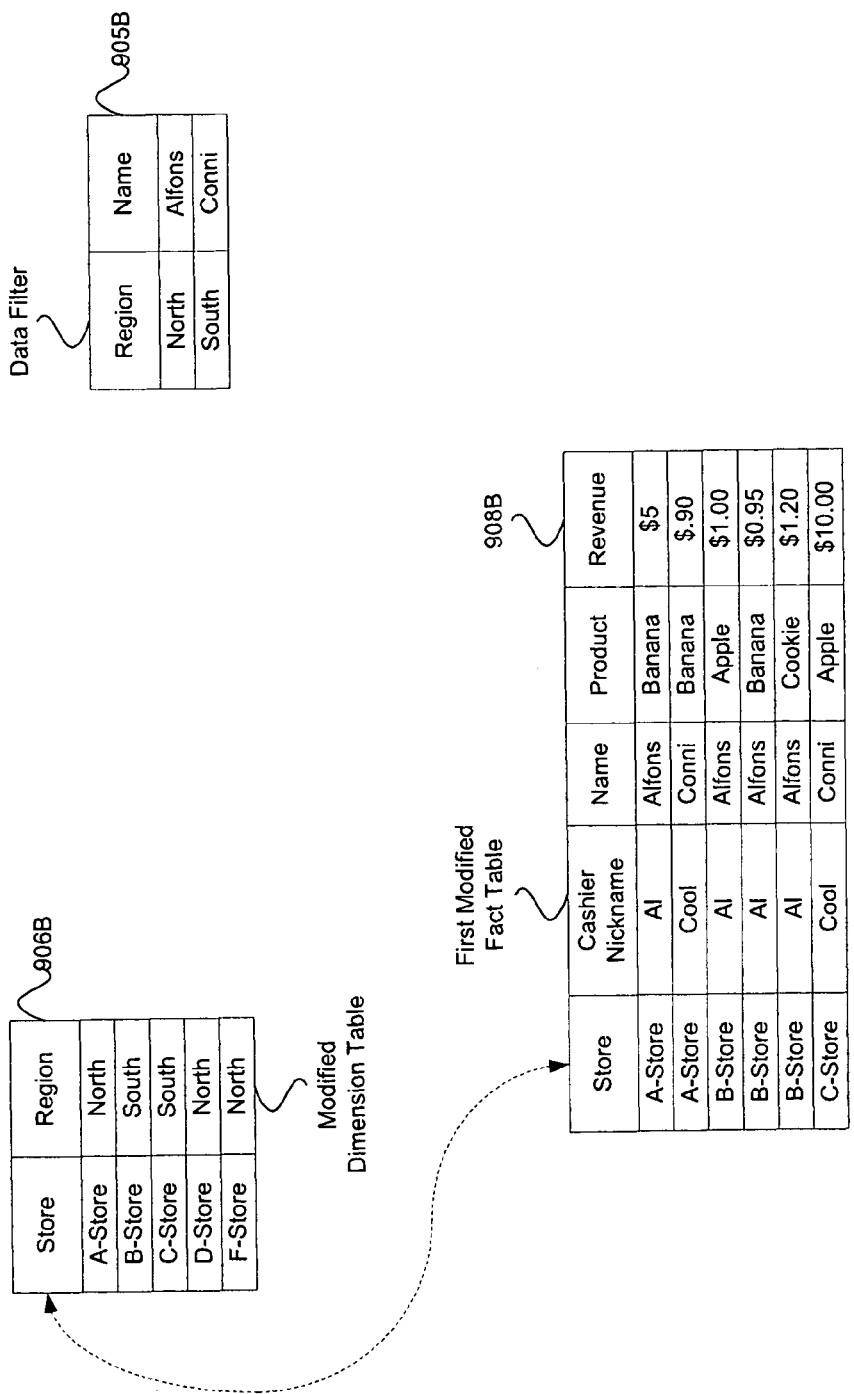
FIG. 9B illustrates the result after the step in FIG. 9A.
Figure 10B:
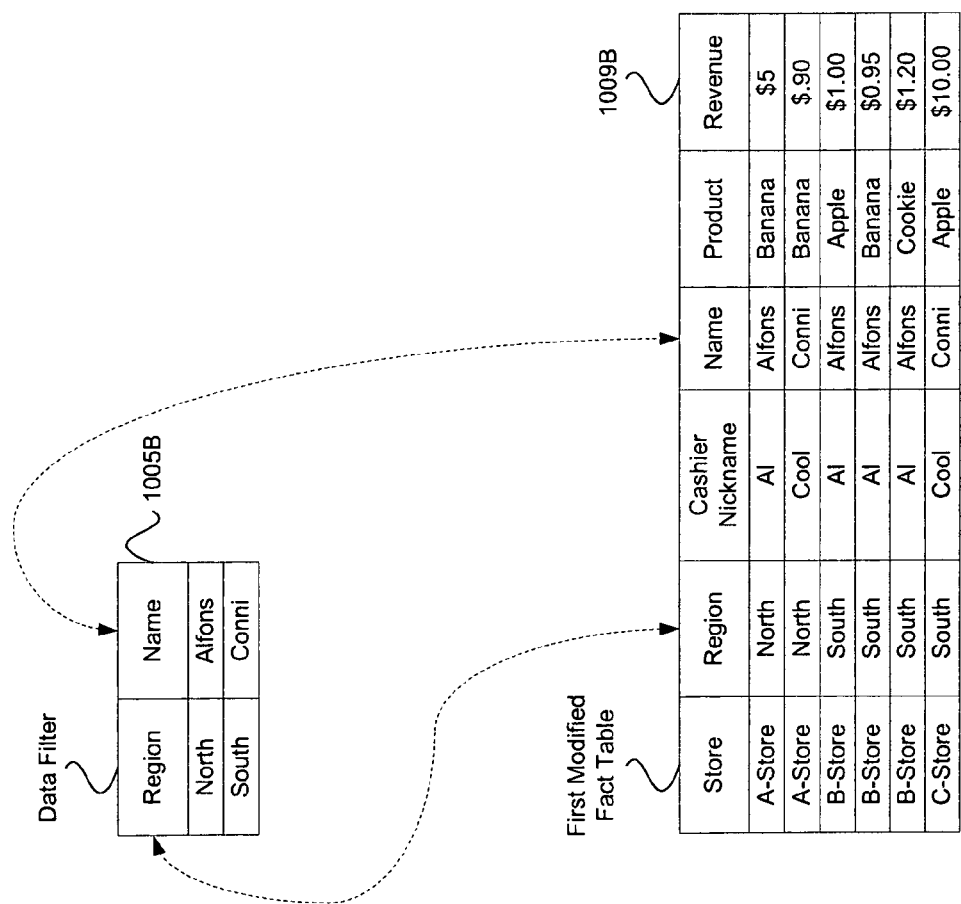
FIG. 10B illustrates the result after the step in FIG. 10A.

At step 509, a modified dimension table may be selected. Based on FIG. 9A, modified dimension table 907A may be selected. Next, at 510, a row in the fact table may be selected. For example, in FIG. 9A, the first row in fact table 901A may be selected ("Store: A-Store," "Cashier Nickname: Al," "Product: Banana," and "Revenue: $5"). Then, looking at FIG. 5B at step 511, it may be determined whether the value in the column in the selected row corresponding to the column in the selected modified dimension table may be specified in the selected modified dimension table. If so, the method continues to 512 where the selected row may be included when generating the first modified fact table (i.e., step 516). Otherwise, the method continues to 513 where the selected row may not be included when generating the first modified fact table (i.e., step 516). In FIG. 9A the "Cashier Nickname" column in the selected row corresponds to the "Cashier Nickname" column in selected modified dimension table 907A. Thus, it may be determined whether the value "Al" in the "Cashier Nickname" column in the selected row may be specified in the "Cashier Nickname" column of selected modified dimension table 907A. Since the value "Al" is in the "Cashier Nickname" column in the selected row may be specified in the "Cashier Nickname" column of selected modified dimension table 907A, the method continues to step 512 where the selected row may be included when generating the first modified fact table (i.e., step 516). Steps 512 and 513 both continue to step 514 where the fact table may be checked whether all rows in the fact table have been selected. If so, the method moves to 515. If not, the method moves back to 510 in FIG. 5A where steps 511-513 in FIG. 5B may be repeated until all the rows in the fact table have been selected. FIG. 9B illustrates an unfinished generation of first modified fact table 608B after all the rows in modified dimension table 907A of FIG. 9A have been selected. At 515, the modified dimension tables may be checked whether all the modified dimension tables have been selected. If all the modified dimension tables have been selected, the method proceeds to step 516. Otherwise, the method proceeds back to 509 in FIG. 5A where steps 510-514 in FIGS. 5A-B may be repeated until all the modified dimension tables have been selected. At 516, a first modified fact table may be generated where the first modified fact table includes the rows determined to be included from step 512 and does not include the rows determined to not be included from step 513. FIG. 10B shows first modified fact table 1009B generated at step 516.

At step 517, a row in the first modified fact table may be selected. For example, referring to FIG. 11, the first row in first modified fact table 1109 may be selected ("Store: A-Store," "Region: North," "Cashier Nickname: Al," "Name: Alfons," "Product: Banana," and "Revenue: $5"). At 518, a row in the data filter may be selected. Continuing the example, the first row in data filter 1105 may be selected ("Region: North," and "Name: Alfons"). Then, at step 519 I FIG. 5C, for each column in the selected row of the data filter, it may be determined whether the value in the column in the selected row of the first modified fact table corresponding to the column in the selected row of the data filter is specified in the column in the selected row of the data filter. Continuing with the example, the "Region" column in the selected row of first modified fact table 1109 corresponds to the "Region" column in the selected row of data filter 1105. Therefore, it may be determined whether the value "North" in the "Region" column in the selected row of first modified fact table 1109 may be specified in the "Region" column in the selected row of data filter 1105. Likewise, the "Name" column in the selected row of first modified fact table 1109 corresponds to the "Name" column in the selected row of data filter 1105. Hence, it may be determined whether the value "Alfons" in the "Name" column in the selected row of first modified fact table 1109 may be specified in the "Name" column in the selected row of data filter 1105. If, for each column in the data filter, the value in the selected row of the first modified fact table is specified in the selected row of the data filter, the method continues to 520 where the selected row of the first modified may be included when generating the second modified fact table (i.e., step 524). Otherwise, the method continues to 521 where the selected row of the first modified fact table may not be included when generating the second modified fact table (i.e., step 524). Following the example, the method continues to step 520 because the value "North" in the "Region" column in the first row of first modified fact table 1109 (i.e., the selected row of first modified fact table 1109) is specified in the "Region" column in the first row of data filter 1105, and the value "Alfons" in the "Name" column in first row of first modified fact table 1109 (i.e., the selected row of first modified fact table 1109) is also specified in the "Name" column in the first row of data filter 1105. In other words, the value in each column in the first row in data filter 1105 is specified in the corresponding column in the first row of modified fact table 1109 (i.e., the selected row of first modified fact table 1109). If, at step 519, a selected first modified fact table row is determined to be included when generating the second modified fact table (i.e., step 524), steps 519-521 do not need to be performed on the remaining unselected rows in the data filter since it has already been determined that the selected first modified fact table row to be included when generating the second modified fact table (i.e., step 524). Accordingly, the method moves from step 520 to step 523, skipping step 522. Continuing with this example, since the first row of first modified fact table 1109 may be determined to be included when generating the second modified fact table (i.e., step 524), the method continues to step 523. On the other hand, if, at step 519, a selected first modified fact table row is determined to not be included when generating the second modified fact table (i.e., step 524), the method proceeds to 522 where the data filter may be checked whether all rows in the data filter have been selected. If so, the method moves to 523. If not, the method moves back to 518 in FIG. 5B where steps 519-521 in FIG. 5C may be repeated until all the rows in the data filter have been selected. At 523, the first modified fact table may be checked whether all the rows in the first modified fact table have been selected. If all the rows in the first modified fact table have been selected, the method proceeds to step 524. Otherwise, the method proceeds back to 517 in FIG. 5B where steps 518-522 in FIGS. 5B-C may be repeated until all the rows in the first modified fact table have been selected. Finally, at 524, a second modified fact table may be generated where the second modified fact table includes the rows determined to be included from step 520 and does not include the rows determined to not be included from step 521. FIG. 11 shows second modified fact table 1110 generated at step 524.

Figure 12:
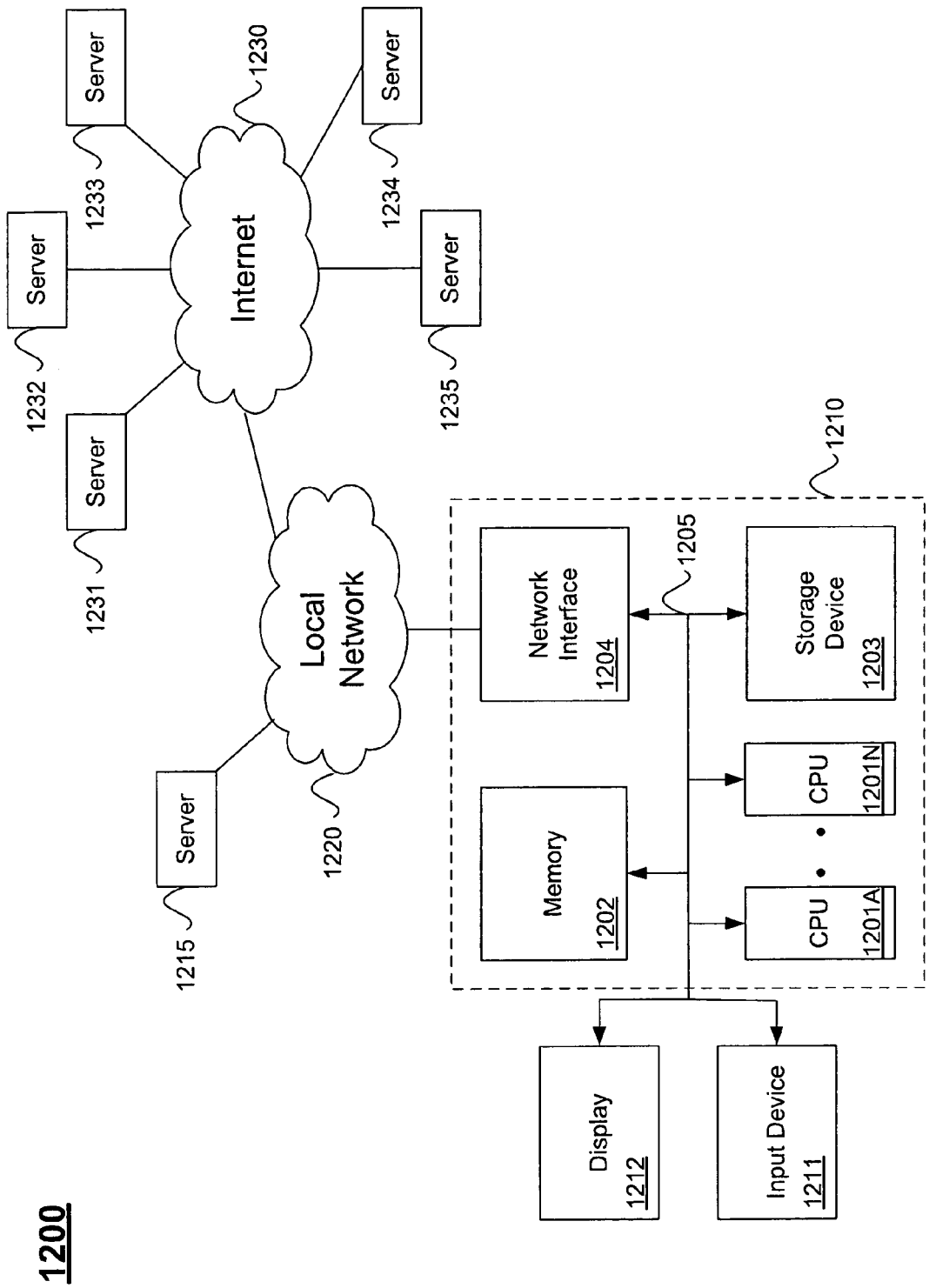
FIG. 12 illustrates a hardware system for implementing processes according to one embodiment of the present invention.

FIG. 12 illustrates a simplified diagram of a hardware system for implementing processes according to one embodiment of the present invention. In certain embodiments of the present invention, relational database management system 101 of FIG. 1 may be configured to execute on computer system 1210. Computer system 1210 includes one or more buses 1205 or other communication mechanism for communicating information, and one or more central processing units ("CPUs" or "processors") 1201 coupled with bus 1205 for processing information. The central processing unit may be configured to perform the functions described above and, when programmed to carry out the operations describe above, is the means for performing some of the functions described above. In some embodiments, the central processing unit may be configured to perform the methods illustrated in FIGS. 3-5 and described above. In other embodiments, processing engine 102 of FIG. 1 may be configured to execute on a central processing unit 1201. Computer system 1210 also includes one or more memories 1202 coupled to bus 1205 for storing information and instructions to be executed by processors 1201, including information and instructions for performing the techniques described above, for example. This memory may also be used for storing variables or other intermediate information during execution of instructions to be executed by processors 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques or embodying the constructs above, for example. In some embodiments, data repository 103 of FIG. 1 may be configured to store information on storage device 1203, for example.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1004 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 1204 sends and receives electrical, electromagnetic, or optical signals that carry digital data streams representing various types of information.

Computer system 1210 can send and receive information, including messages or other interface actions, through the network interface 1004 to an Intranet or the Internet 1230. In the Internet example, software components or services may reside on multiple different computer systems 1210 or servers 1231-1235 across the network. The servers are also computer systems having hardware including memory, processors (CPUs), storage, and network interfaces, for example. The processes described above may be implemented on one or more servers, for example. A server 1231 may transmit actions or messages from one component, through Internet 1230, local network 1220, and network interface 1204 to a component on computer system 1210. Different processes may be implemented on any computer system and send and/or receive information across a network, for example. In one embodiment, the techniques describe above may be implemented by software services on one or more servers 1231-1235, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a data filter table for filtering a collection of data, wherein the collection of data is configured as a star schema that includes one fact table and one or more dimension tables associated with the fact table, wherein the data filter table includes a plurality of columns, wherein one or more columns of the plurality of columns are associated with a corresponding one or more dimension tables in the collection of data; and
processing the collection of data, wherein the processing includes:
applying the data filter table to one or more dimension tables in the collection of data to generate one or more modified dimension tables, including for each column in the data filter table associated with a dimension table, generating a modified dimension table, wherein the modified dimension table includes rows from the associated dimension table in the collection of data that satisfy the data filter table and does not include rows from the associated dimension table in the collection of data that do not satisfy the data filter table;
applying each modified dimension table to the fact table to generate a first modified fact table, wherein the first modified fact table includes rows from the fact table that satisfy each modified dimension table and does not include rows from the fact table that do not satisfy each modified dimension table; and
applying the data filter table to the first modified fact table to generate a second modified fact table, wherein the second modified fact table includes rows from the first modified fact table that satisfy the data filter table and does not include rows from the first modified table that do not satisfy the data filter table.

2. The method of claim 1, further comprising communicating the second modified fact table to a request initiator.

3. The method of claim 1, wherein the data filter table is received in a relational database management system.

4. The method of claim 1, wherein generating a modified associated dimension table includes performing a join operation on the associated dimension table and the data filter table and eliminating all duplicate rows.

5. The method of claim 1, wherein generating the first modified fact table includes performing a join operation on the fact table and the modified dimension tables.

6. The method of claim 1, wherein generating the second modified fact table includes performing a join operation on the first modified fact table and the data filter table.

7. The method of claim 1, wherein a row from an associated dimension table in the collection of data satisfies the data filter table if a value in a column of said row matches a value in a corresponding column of said data filter table.

8. The method of claim 1, wherein a row from the fact table satisfies a modified dimension table if a value in a column of said row matches a value in a corresponding column of said data filter table.

9. The method of claim 8, wherein rows of the modified fact table further comprise one or more additional columns from the modified dimension table.

10. The method of claim 1, wherein a row from the first modified fact table satisfies the data filter table if, for each column in at least one first data filter table row, a value in said column matches a value in a corresponding column in said row from the first modified fact table.

11. A computer-readable medium containing instructions for controlling a computer system to perform a method, said method comprising:

receiving a data filter table for filtering a collection of data, wherein the collection of data is configured as a star schema that includes one fact table and one or more dimension tables associated with the fact table, wherein the data filter table includes a plurality of columns, wherein one or more columns of the plurality of columns are associated with a corresponding one or more dimension tables in the collection of data; and processing the collection of data, wherein the processing includes:

applying the data filter table to one or more dimension tables in the collection of data to generate one or more modified dimension tables, including for each column in the data filter table associated with a dimension table, generating a modified dimension table, wherein the modified dimension table includes rows from the associated dimension table in the collection of data that satisfy the data filter table and does not include rows from the associated dimension table in the collection of data that do not satisfy the data filter table, wherein the combination of values of a first row and the combination of values of a second row are different;

applying each modified dimension table to the fact table to generate a first modified fact table, wherein the first modified fact table includes rows from the fact table that satisfy each modified dimension table and does not include rows from the fact table that do not satisfy each modified dimension table; and applying the first modified dimension table to the fact table to generate a second modified fact table, wherein the second modified fact table includes rows from the first modified fact table that satisfy the data filter table and does not include rows from the first modified table that do not satisfy the data filter table.

12. The method of claim 11, further comprising communicating the second modified fact table to a request initiator.

13. The method of claim 11, wherein the data filter table is received in a relational database management system.

14. The method of claim 11, wherein generating a modified associated dimension table includes performing a join operation on the associated dimension table and the data filter table and eliminating all duplicate rows.

15. The method of claim 11, wherein generating the first modified fact table includes performing a join operation on the fact table and the modified dimension tables.

16. The method of claim 11, wherein generating the second modified fact table includes performing a join operation on the first modified fact table and the data filter table.

17. The method of claim 11, wherein a row from an associated dimension table in the collection of data satisfies the data filter table if a value in a column of said row matches a value in a corresponding column of said data filter table.

18. The method of claim 11, wherein a row from the fact table satisfies a modified dimension table if a value in a column of said row matches a value in a corresponding column of said data filter table.

19. The method of claim 18, wherein rows of the modified fact table further comprise one or more additional columns from the modified dimension table.

20. The method of claim 11, wherein a row from the first modified fact table satisfies the data filter table if, for each column in at least one first data filter table row, a value in said column matches a value in a corresponding column in said row from the first modified fact table.

* * * * *